(12) United States Patent
Ferguson et al.

(10) Patent No.: US 11,948,261 B2
(45) Date of Patent: Apr. 2, 2024

(54) POPULATING A GRAPHICAL ENVIRONMENT

(71) Applicant: Apple Inc., Cupertino, CA (US)

(72) Inventors: Stuart Harl Ferguson, Sunnyvale, CA (US); Richard Ignatius Punsal Lozada, Cupertino, CA (US); James Graham McCarter, Erie, CO (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/114,353

(22) Filed: Feb. 27, 2023

(65) Prior Publication Data

US 2023/0377282 A1 Nov. 23, 2023

Related U.S. Application Data

(63) Continuation of application No. 17/155,175, filed on Jan. 22, 2021, now Pat. No. 11,593,995.

(60) Provisional application No. 62/979,585, filed on Feb. 21, 2020.

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS 10,235,601 B1 * 3/2019 Wrenninge ............ G06F 18/214
2018/0286069 A1 * 10/2018 Takahashi ............... G06T 15/20

* cited by examiner

*Primary Examiner* — Kee M Tung
*Assistant Examiner* — Jed-Justin Imperial
(74) *Attorney, Agent, or Firm* — Fernando & Partners, LLP

(57) ABSTRACT

Various implementations disclosed herein include devices, systems, and methods for generating variations of an object. In various implementations, a device includes a display, a non-transitory memory and one or more processors coupled with the display and the non-transitory memory. In some implementations, a method includes obtaining a request to populate an environment with variations of an object characterized by at least one visual property. In some implementations, the method includes generating the variations of the object by assigning corresponding values for the at least one visual property based on one or more distribution criterion. In some implementations, the method includes displaying the variations of the object in the setting in order to satisfy a presentation criterion.

20 Claims, 16 Drawing Sheets

300

Obtain a request to populate an environment with variations of an object characterized by at least one visual property — 302

Generate the variations of the object by assigning corresponding values for the at least one visual property based on a distribution criterion — 304

Displaying the variations of the object in the environment in order to satisfy a presentation criterion — 306

POPULATING A GRAPHICAL ENVIRONMENT

CROSS-REFERENCE TO RELATED APPLICATION

This application is a continuation application of and claims priority to U.S. patent application Ser. No. 17/155,175, filed on Jan. 22, 2021, which claims priority to U.S. Provisional Patent App. No. 62/979,585, filed on Feb. 21, 2020, which are incorporated by reference in their entirety.

TECHNICAL FIELD

The present disclosure generally relates to populating a graphical environment.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
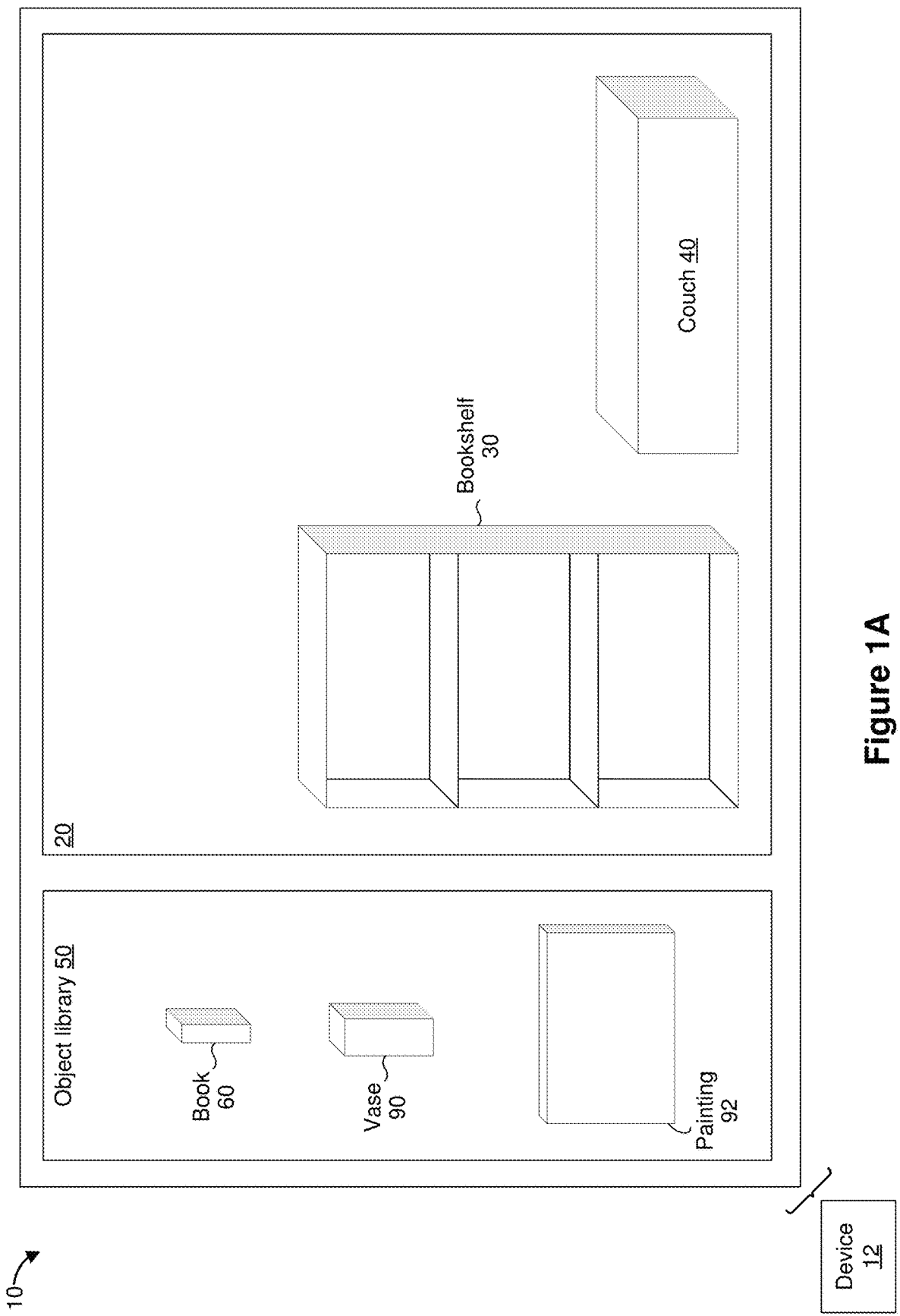
FIGS. 1A-1K depict exemplary systems for use in various computer extended reality (XR) technologies.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating variations of an object in a computer graphics environment. In various implementations, a device includes a display, a non-transitory memory and one or more processors coupled with the display and the non-transitory memory. In some implementations, a method includes obtaining a request to populate a graphical environment with variations of an object characterized by at least one visual property. In some implementations, the method includes generating the variations of the object by assigning corresponding values for the at least one visual property based on one or more distribution criterion. In some implementations, the method includes displaying the variations of the object in the graphical environment in order to satisfy a presentation criterion.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands).

A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Sometimes there is a need to populate a graphical environment such as an XR environment with numerous instances of an object (hereafter "XR object"). However, simply replicating the XR object numerous times tends to result in an unrealistic XR environment. For example, placing hundreds of replicas of the same XR book on an XR bookshelf makes the XR bookshelf appear less realistic. Similarly, placing hundreds of replicas of the same XR car in an XR parking lot makes the XR parking lot appear less realistic. Also, storing slight variations of an XR object can be resource-intensive. For example, storing numerous variations of an XR object occupies an excessive amount of memory.

The present disclosure provides methods, systems, and/or devices for generating bounded variations of an XR object when the XR object is being used numerous times to populate an XR environment. For example, if an XR bookshelf is to be populated with an XR book, then the various instances of the XR book are varied in order to provide a more realistic appearance to the XR bookshelf. As an example, a color, a thickness and/or a size of the various instances of the XR book are varied in order to provide a more realistic appearance to the XR bookshelf. By varying the numerous instances of the XR object, the XR environment tends to appear more realistic thereby enhancing a user experience. Generating variations of an XR object also reduces the need to store different XR objects thereby conserving memory on devices with memory constraints. Generating variations of an XR object reduces a need for user inputs that correspond to copying the XR object numerous times and manually making changes to the numerous copies of the XR object. Reducing unnecessary user inputs tends to enhance operability of the device by reducing power consumption associated with processing (e.g., detecting, interpreting and/or acting upon) unnecessary user inputs.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 12. In some implementations, the electronic device 12 is held by a user (not shown). In some implementations, the electronic device 12 includes a smartphone, a tablet, a laptop, or the like.

In some implementations, the electronic device 12 displays an XR environment 20 (e.g., a graphical environment). The XR environment 20 includes various XR objects (e.g., graphical objects). For example, the XR environment 20 includes an XR bookshelf 30 and an XR couch 40. In some implementations, the electronic device 12 displays an XR object library 50. The XR object library 50 stores various XR objects that can be instantiated in the XR environment 20. In the example of FIG. 1A, the XR object library 50 includes an XR book 60, an XR vase 90, and an XR painting 92.

In some implementations, the electronic device 12 includes a head-mountable device (HMD) that can be worn by the user. In some implementations, the HMD includes an integrated display (e.g., a built-in display) that displays the XR environment 20. In some implementations, the HMD includes a head-mountable enclosure. In various implementations, the head-mountable enclosure includes an attachment region to which another device with a display can be attached. For example, in some implementations, a smartphone or a tablet can be attached to the head-mountable enclosure. In various implementations, the head-mountable enclosure is shaped to form a receptacle for receiving another device that includes a display (e.g., a smartphone or a tablet). For example, in some implementations, a smartphone or a tablet slides/snaps into or otherwise attaches to the head-mountable enclosure. In some implementations, the display of the device attached to the head-mountable enclosure presents (e.g., displays) the XR environment 20.

Figure 1B:
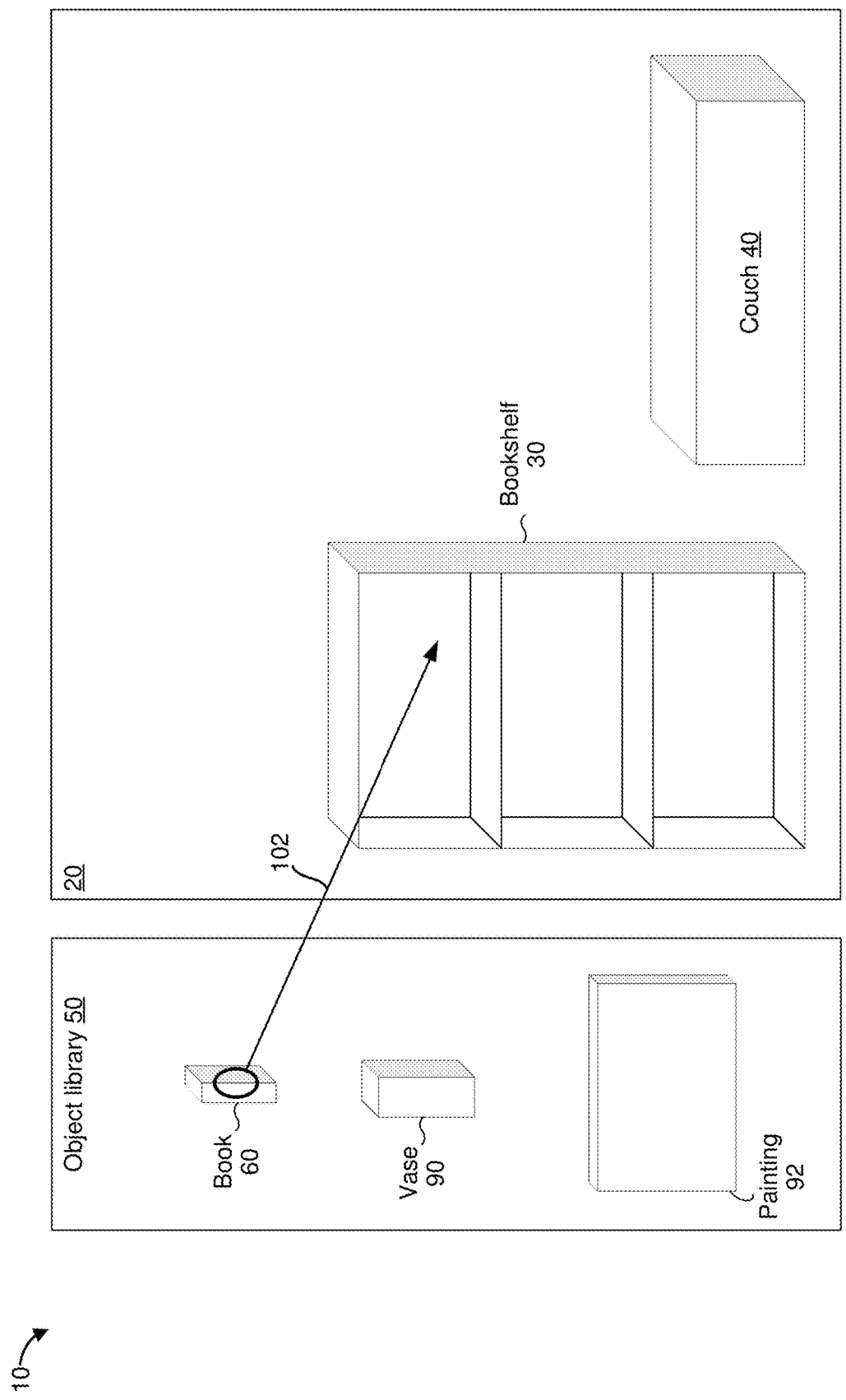
Figure 1C:
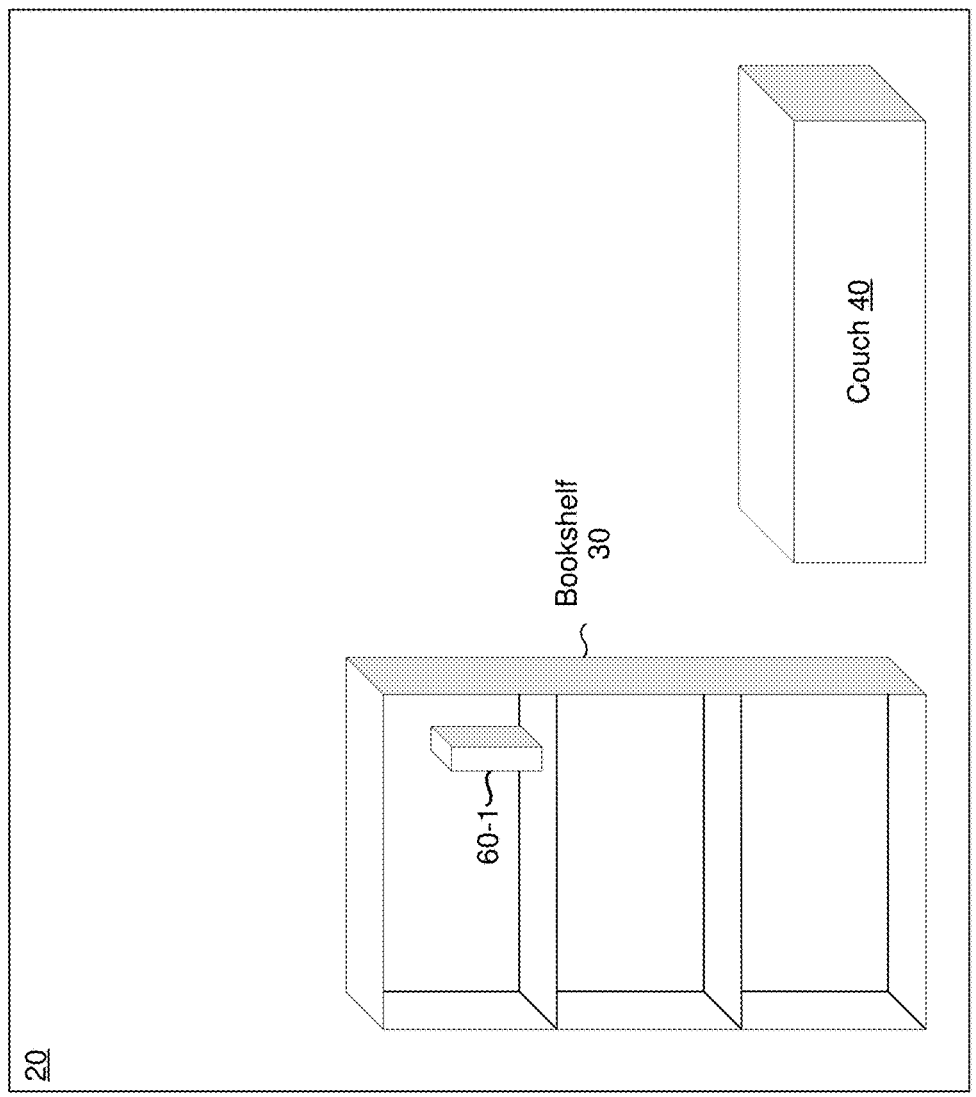
Figure 1C:
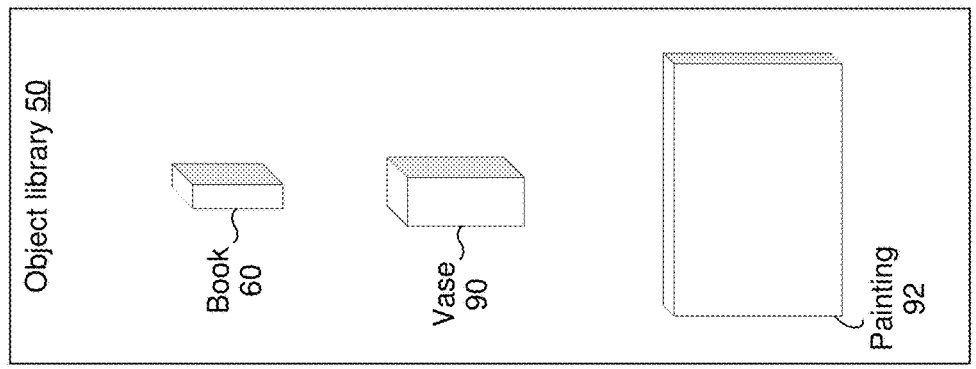

Referring to FIG. 1B, the electronic device 12 detects a user input 102 that corresponds to a request to place the XR book 60 in the XR environment 20. Specifically, the user input 102 corresponds to a request to place the XR book 60 on the XR bookshelf 30. In the example of FIG. 1B, the user input 102 includes a drag gesture that starts at a display location corresponding to the XR book 60 and ends at a display location corresponding to the XR bookshelf 30. As shown in FIG. 1C, in response to detecting the user input 102 in FIG. 1B, the electronic device 12 displays a first variation 60-1 of the XR book 60 on the XR bookshelf 30. In some implementations, the first variation 60-1 is identical to the XR book 60. For example, the first variation 60-1 is a replica of the XR book 60.

Figure 1D:
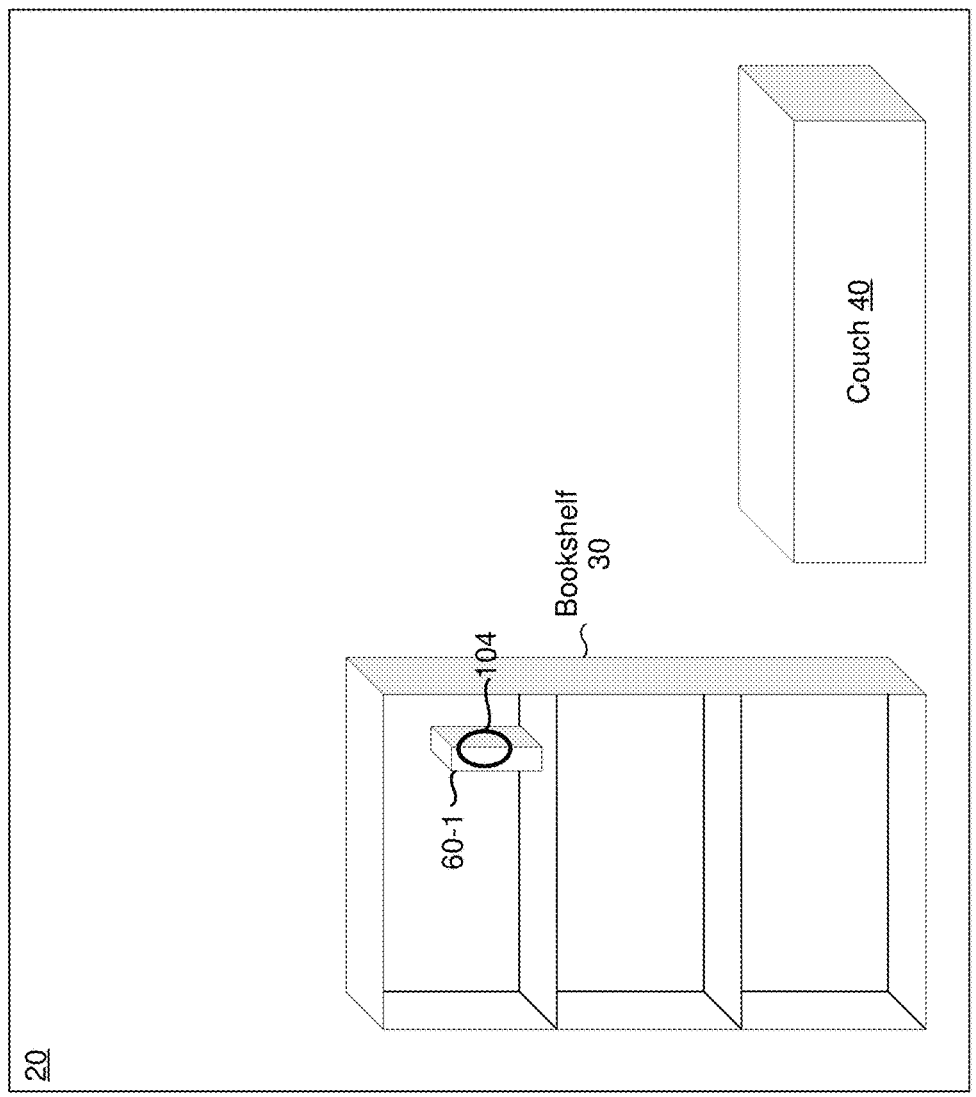
Figure 1D:
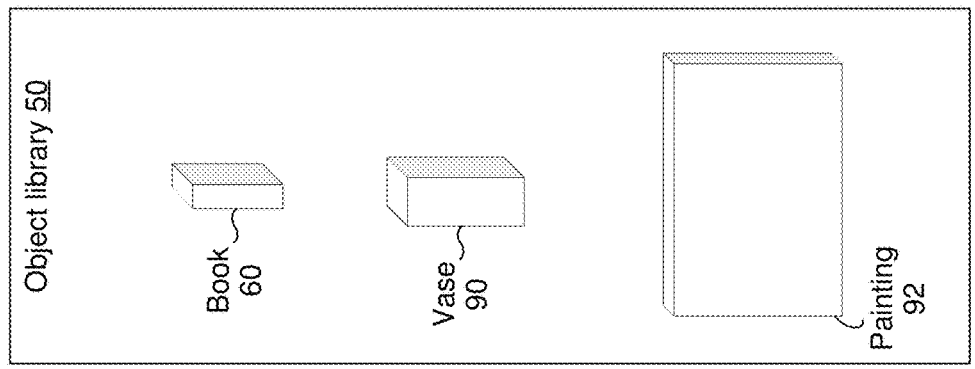

FIGS. 1D-1G illustrate an example sequence of operations for populating the XR bookshelf 30 with various variations of the XR book 60. Referring to FIG. 1D, the electronic device 12 detects a user input 104 at a location corresponding to the first variation 60-1 of the XR book 60. In some implementations, detecting the user input 104 includes detecting a contact at a location corresponding to the first variation 60-1 for a threshold amount of time (e.g., a long press).

Figure 1E:
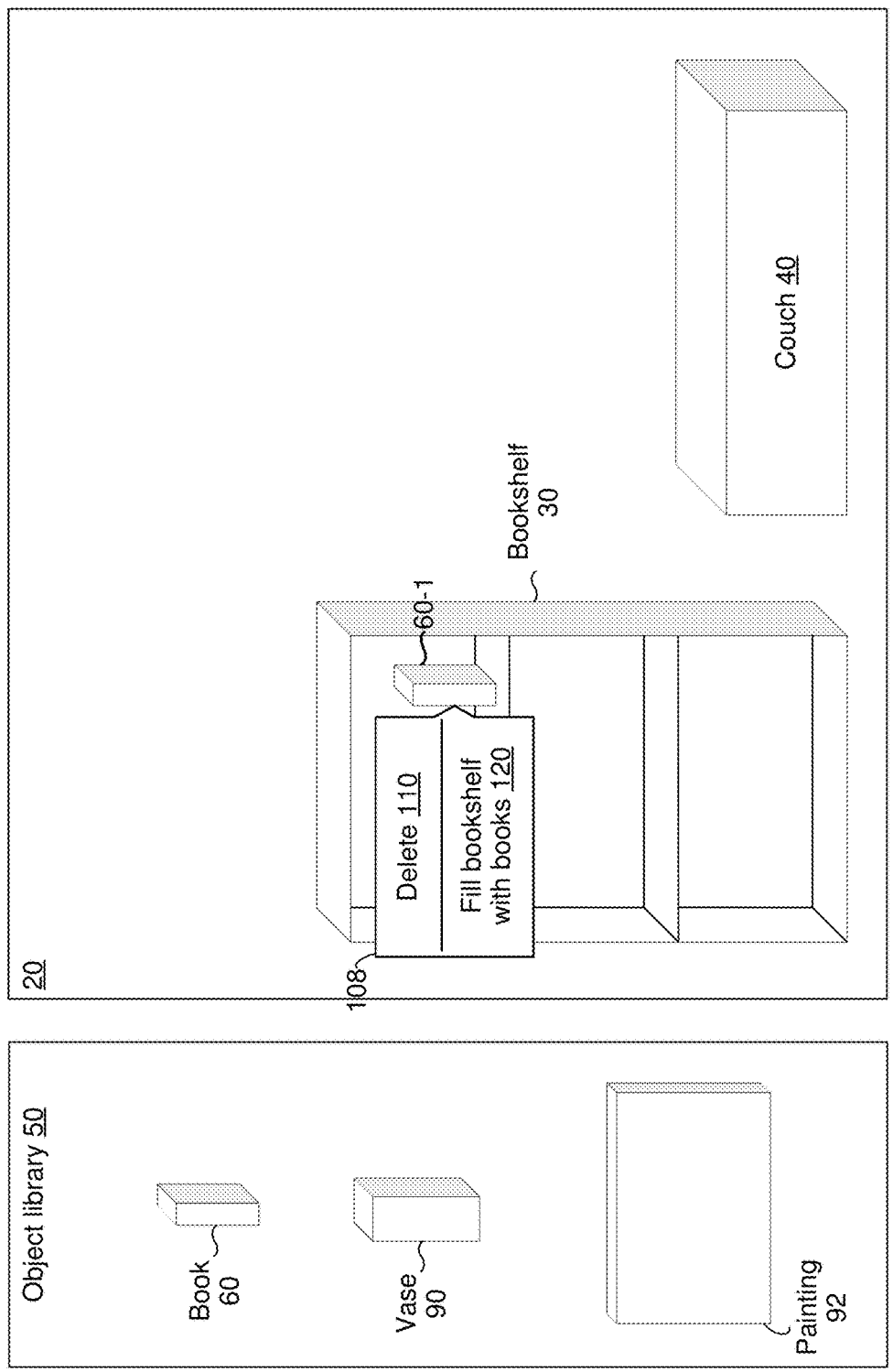

Referring to FIG. 1E, in response to detecting the user input 104 in FIG. 1E, the electronic device 12 displays a menu 108 that includes one or more affordances. In the example of FIG. 1E, the menu 108 includes a delete affordance 110 for deleting the first variation 60-1 of the XR book 60 from the XR bookshelf 30. In the example of FIG. 1E, the menu also includes a fill affordance 120 for populating the XR bookshelf 30 with additional variations of the XR book 60.

Figure 1F:
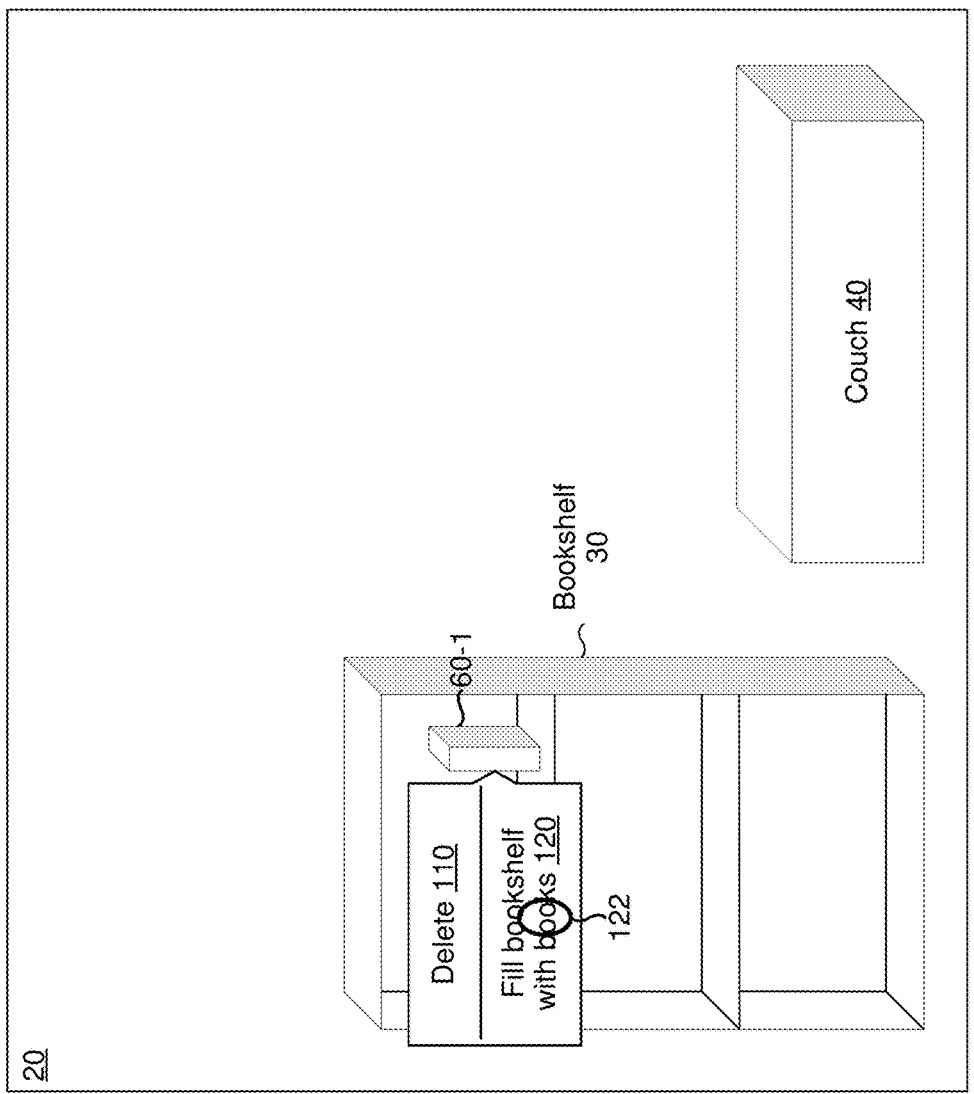
Figure 1F:
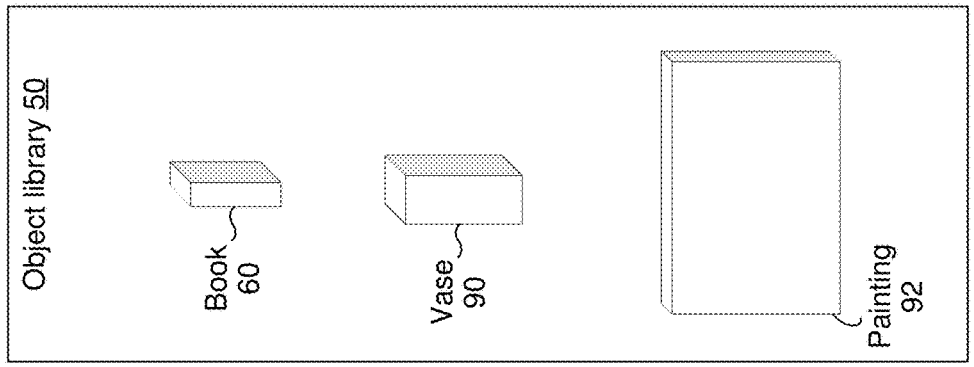
Figure 1G:
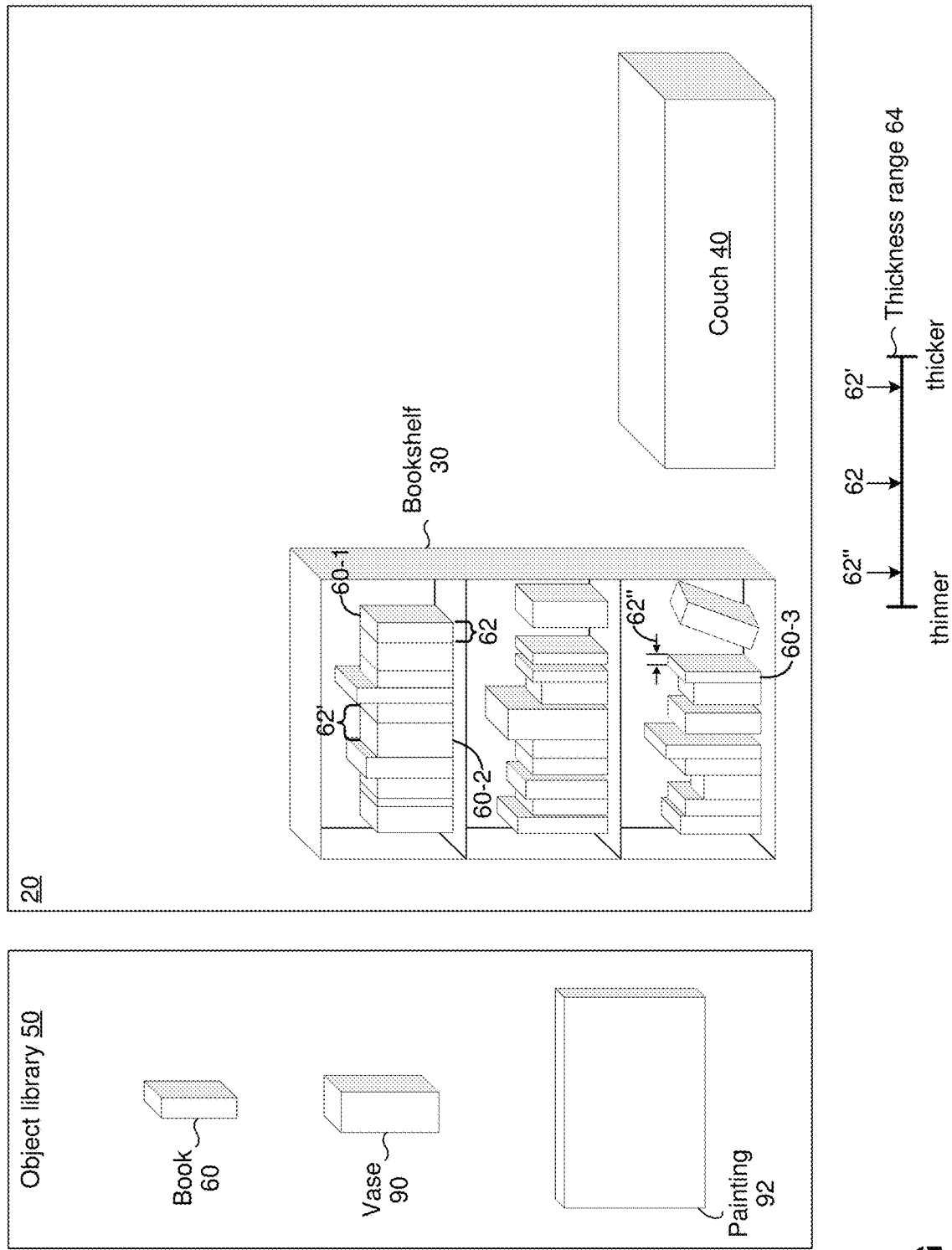

Referring to FIG. 1F, the electronic device 12 detects a user input 122 at a location corresponding to the fill affordance 120. The user input 122 corresponds to a request to populate the XR bookshelf 30 with additional variations of the XR book 60. As shown in FIG. 1G, in response to detecting the user input 122 in FIG. 1F, the electronic device 12 generates and displays additional variations of the XR book 60. For example, the electronic device 12 generates and displays a second variation 60-2 of the XR book 60 and a third variation 60-3 of the XR book 60.

In various implementations, the XR book 60 is associated with a set of visual properties such as thickness, height, orientation and/or color. In some implementations, the electronic device 12 generates different variations of the XR book 60 by assigning different values to the visual properties of the XR book 60. In some implementations, the electronic device 12 assigns the values based on a distribution criterion.

In the example of FIG. 1G, the first variation 60-1 is associated with a first thickness value 62, the second variation 60-2 is associated with a second thickness value 62' and the third variation 60-3 is associated with a third thickness value 62". As can be seen in FIG. 1G, the first thickness value 62, the second thickness value 62' and the third thickness value 62" are different from each other.

In some implementations, the first thickness value 62, the second thickness value 62' and the third thickness value 62" are bounded by a thickness distribution range 64. As can be seen in FIG. 1G, the first thickness value 62, the second thickness value 62' and the third thickness value 62" are distributed across the thickness distribution range 64. In the example of FIG. 1G, the first thickness value 62 is towards a middle of the thickness distribution range 64, the second thickness value 62' is towards a first end of the thickness distribution range 64 that corresponds with thinner books, and the third thickness value 62" is towards a second end of the thickness distribution range 64 that corresponds with thicker books.

In some implementations, the first thickness value 62, the second thickness value 62' and the third thickness value 62" satisfy a thickness presentation criterion. In some implementations, the thickness presentation criterion specifies that variations of the XR book 60 have varying thickness values, for example, in order to appear more realistic. In some implementations, the thickness values and/or the thickness distribution range 64 correspond to a specific time period (e.g., the Victorian era). In such implementations, the thickness values and/or the thickness distribution range 64 match the thickness of physical books from that specific time period.

Figure 1H:
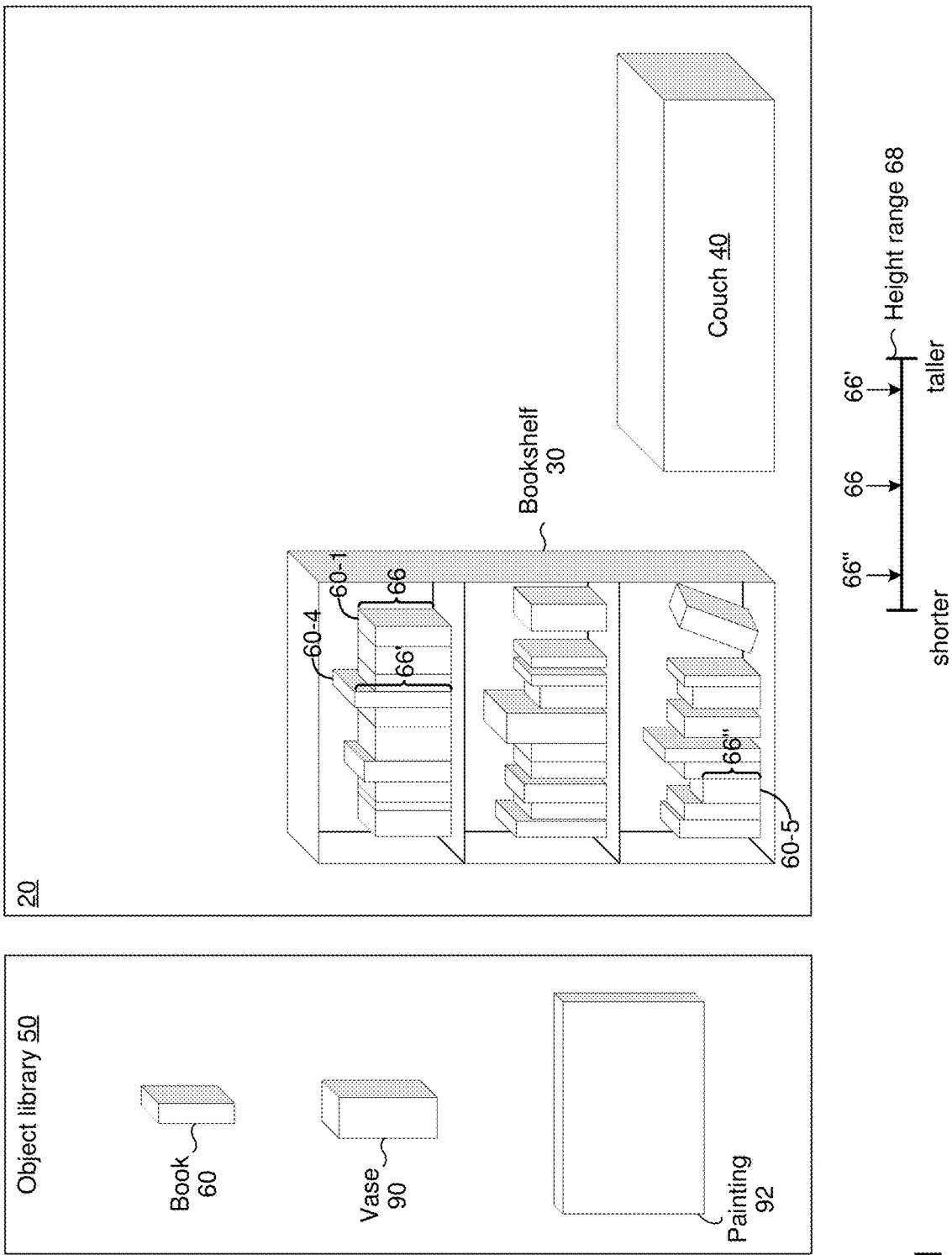

Referring to FIG. 1H, in some implementations, the variations of the XR book 60 are associated with different height values. In the example of FIG. 1H, the first variation 60-1 is associated with a first height value 66, a fourth variation 60-4 is associated with a second height value 66' and a fifth variation 60-5 is associated with a third height value 66". As can be seen in FIG. 1H, the first height value 66, the second height value 66' and the third height value 66" are different from each other.

In some implementations, the first height value 66, the second height value 66' and the third height value 66" are bounded by a height distribution range 68. As can be seen in FIG. 1H, the first height value 66, the second height value 66' and the third height value 66" are distributed across the height distribution range 68. In the example of FIG. 1H, the first height value 66 is towards a middle of the height distribution range 68, the second height value 66' is towards a first end of the height distribution range 68 (e.g., an end corresponding to shorter books), and the third height value 66" is towards a second end of the height distribution range 68 (e.g., an end corresponding to taller books).

In some implementations, the first height value 66, the second height value 66' and the third height value 66" satisfy a height presentation criterion. In some implementations, the height presentation criterion specifies that variations of the XR book 60 have varying height values, for example, in order to appear more realistic. In some implementations, the height values and/or the height distribution range 68 correspond to a specific time period (e.g., the Cold War era). In such implementations, the height values and/or the height distribution range 68 match the height of physical books from that specific time period.

Figure 1I:
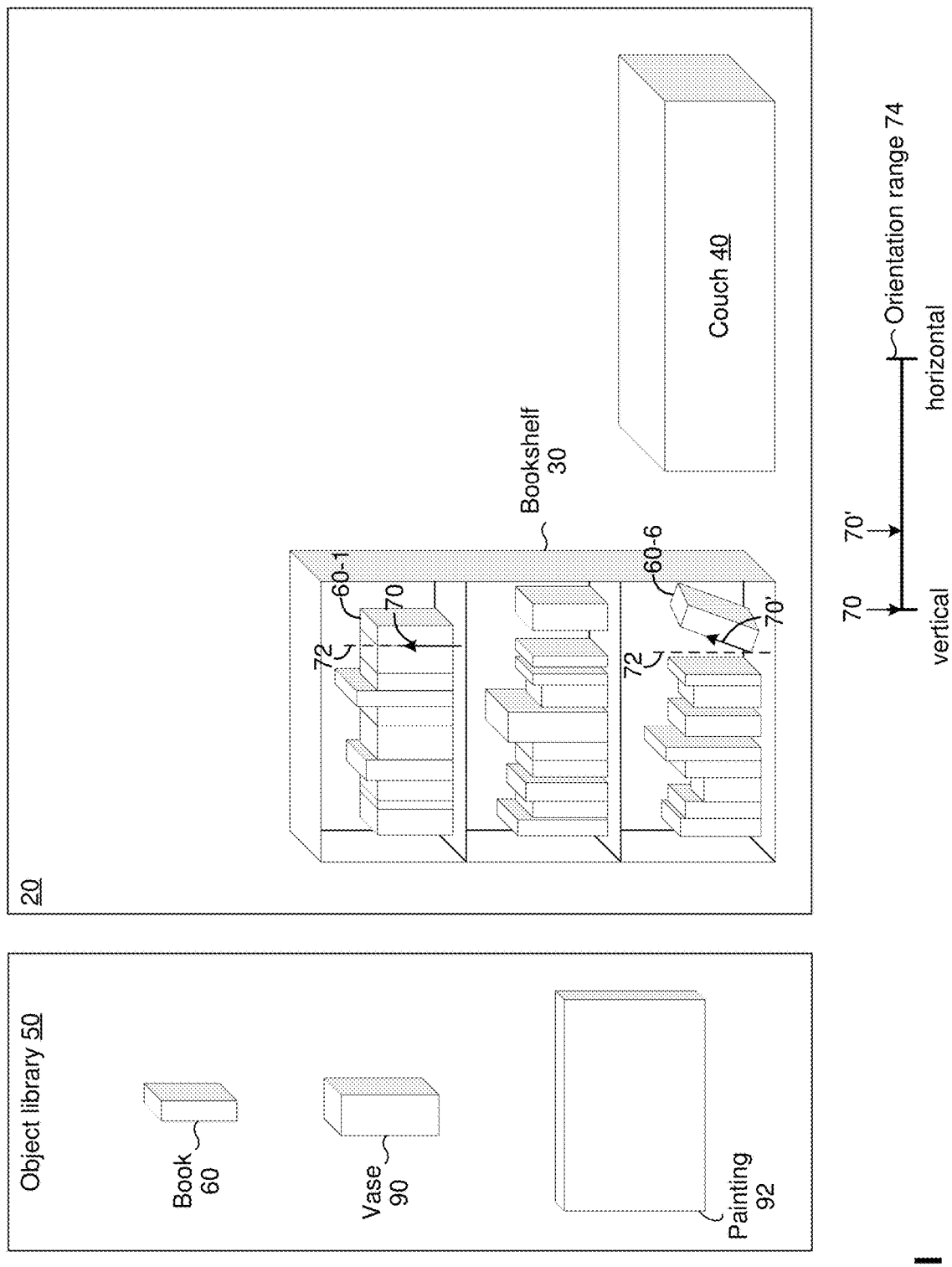

Referring to FIG. 1I, in some implementations, the variations of the XR book 60 are associated with different orientation values. For example, the variations of the XR books 60 are placed at different orientations. In the example of FIG. 1I, the first variation 60-1 is associated with a first orientation value 70, and a sixth variation 60-6 is associated with a second orientation value 70'. As can be seen in FIG. 1I, the first orientation value 70 and the second orientation value 70' are different from each other. The first orientation value 70 corresponds to a vertical orientation in which the first variation 60-1 is parallel to a vertical plane 72.

In some implementations, the first orientation value 70 and the second orientation value 70' are bounded by an orientation distribution range 74. In the example of FIG. 1I, the first orientation value 70 is at a first end of the orientation distribution range 74 (e.g., an end corresponding to a vertical orientation), and the second orientation value 70' is between the first end and a second end of the orientation distribution range 74 (e.g., an end corresponding to a horizontal orientation).

In some implementations, the first orientation value 70 and the second orientation value 70' satisfy an orientation presentation criterion. In some implementations, the orientation presentation criterion specifies that variations of the XR book 60 have varying orientation values, for example, in order to appear more realistic. In some implementations, the orientation values and/or the orientation distribution range 74 correspond to orientations of physical books in a physical environment (e.g., an indicated by an image of a physical bookshelf in the physical environment).

Figure 1J:
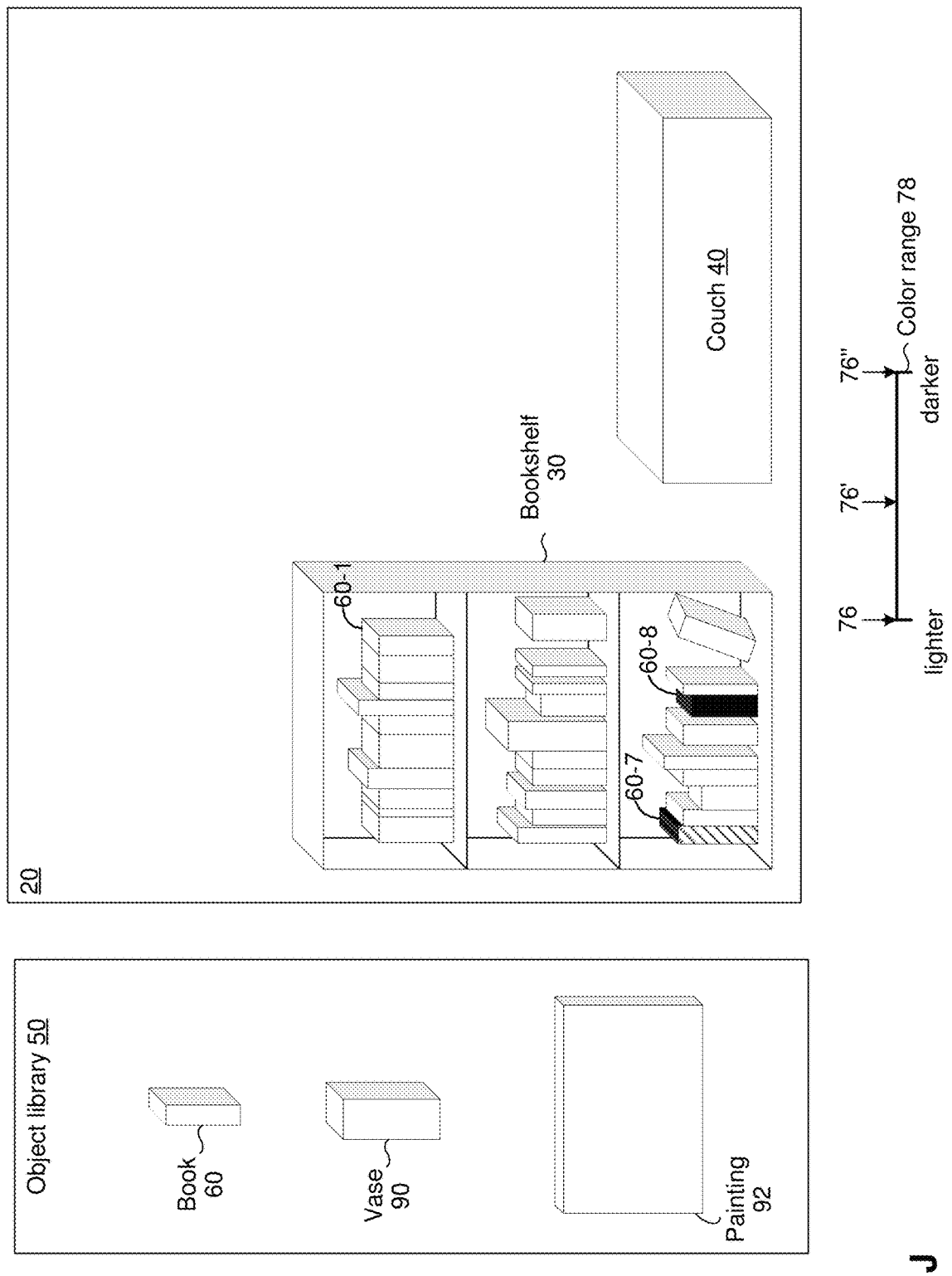

Referring to FIG. 1J, in some implementations, the variations of the XR book 60 are associated with different color values. In the example of FIG. 1J, the first variation 60-1 is associated with a first color value 76, a seventh variation 60-7 is associated with a second color value 76' (e.g., as indicated by cross-hatching) and an eighth variation 60-8 is associated with a third color value 76" (e.g., as indicated by a black fill). As can be seen in FIG. 1J, the first color value 76, the second color value 76' and the third color value 76" are different from each other.

In some implementations, the first color value 76, the second color value 76' and the third color value 76" are bounded by a color distribution range 78. As can be seen in FIG. 1J, the first color value 76, the second color value 76' and the third color value 76" are distributed across the color distribution range 78. In the example of FIG. 1J, the first color value 76 is towards a first end of the color distribution range 78 (e.g., at an end that corresponds to lighter color values), the second color value 76' is towards a middle of the color distribution range 78, and the third color value 76" is towards a second end of the color distribution range 78 (e.g., at another end that corresponds to darker color values).

In some implementations, the first color value 76, the second color value 76' and the third color value 76" satisfy a color presentation criterion. In some implementations, the color presentation criterion specifies that variations of the XR book 60 have varying color values, for example, in order to appear more realistic. In some implementations, the color values and/or the color distribution range 78 correspond to a specific time period (e.g., the modern era). In such implementations, the color values and/or the color distribution range 78 match the color of physical books from that specific time period.

Figure 1K:
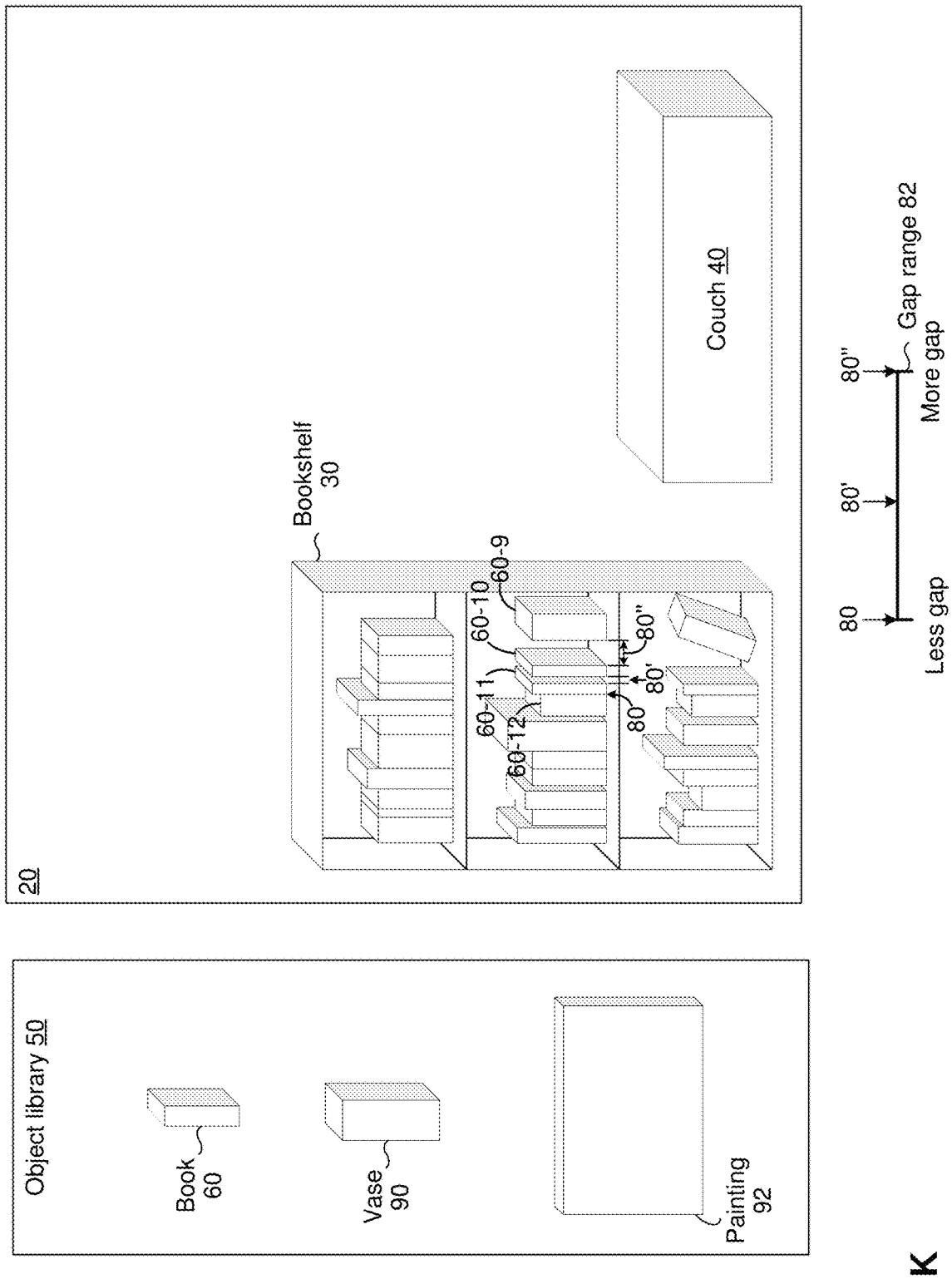

Referring to FIG. 1K, in some implementations, the variations of the XR book 60 are displayed with different amounts of gap. In the example of FIG. 1K, amounts of gap between a ninth variation 60-9, a tenth variation 60-10, an eleventh variation 60-11 and a twelfth variation 60-12 are varied in order to make the XR bookshelf 30 appear more realistic. As can be seen in FIG. 1K, there is a first amount of gap 80 between the eleventh variation 60-11 and the twelfth variation 60-12. In the example of FIG. 1K, the first amount of gap 80 represents no gap. There is a second amount of gap 80' between the tenth variation 60-10 and the eleventh variation 60-11. The second amount of gap 80' is greater than the first amount of gap 80. There is a third amount of gap 80" between the ninth variation 60-9 and the tenth variation 60-10. The third amount of gap 80" is greater than the second amount of gap 80'.

In some implementations, the first amount of gap 80', the second amount of gap 80' and the third amount of gap 80" are bounded by a gap distribution range 82. As can be seen in FIG. 1K, the first amount of gap 80, the second amount of gap 80' and the third amount of gap 80" are distributed across the gap distribution range 82. In the example of FIG. 1K, the first amount of gap 80 is at a first end of the gap distribution range 82 (e.g., at an end that corresponds to less gap), the second amount of gap 80' is towards a middle of the gap distribution range 82, and the third amount of gap 80" is at a second end of the gap distribution range 82 (e.g., at another end that corresponds to more gap).

In some implementations, the first amount of gap 80, the second amount of gap 80' and the third amount of gap 80" satisfy a gap presentation criterion. In some implementations, the gap presentation criterion specifies that variations of the XR book 60 have varying amounts of gap therebetween, for example, in order to appear more realistic. In some implementations, the amounts of gap and/or the gap distribution range 82 correspond to amounts of gap between physical books arranged on a physical bookshelf in a physical environment represented by a set of one or more images.

In some implementations, the electronic device 12 includes (e.g., stores) a set of executable instructions (e.g., a code package and/or a procedural code) that, when executed by the electronic device 12, causes the electronic device 12 to procedurally generate the XR objects in the XR environment 20 (e.g., the variations 60-1, 60-2, . . . , 60-12 of the XR book 60, the XR bookshelf 30, and the XR couch 40).

Figure 2:
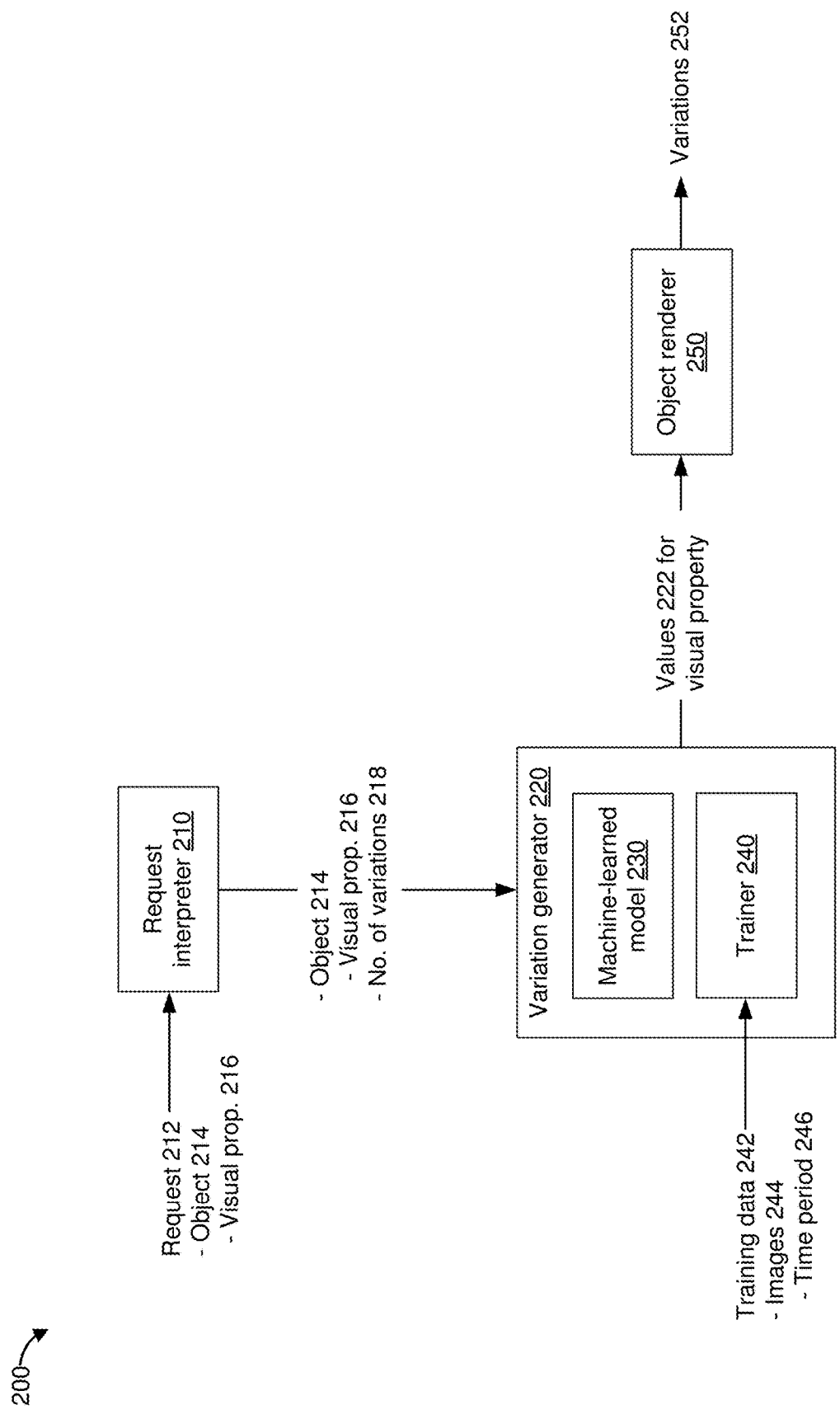
FIG. 2 is a block diagram of a device that generates variations of an object in accordance with some implementations.

FIG. 2 is a block diagram of a system 200 that generates variations 252 of an XR object 214. In some implementations, the system 200 is implemented by the electronic device 12 shown in FIG. 1A. In various implementations, the system 200 includes a request interpreter 210, a variation generator 220, and an XR object renderer 250.

In some implementations, the request interpreter 210 receives a request 212 to generate variations of an XR object 214 (e.g., the XR book 60 shown in FIGS. 1A-1K). In some implementations, the XR object 214 is associated with a visual property 216. In some implementations, the visual property 216 corresponds to a physical dimension of the XR object 214 such as a width of the XR object 214, a thickness of the XR object 214, a length of the XR object 214 and/or a height of the XR object 214. In various implementations, the visual property 216 corresponds to a material property of the XR object 214 such as a color of the XR object 214 and/or a texture of the XR object 214. In various implementations, the visual property 216 corresponds to a placement of the XR object 214 such as an amount of gap between different variations of the XR object 214 and/or an orientation of the XR object 214.

In some implementations, the request interpreter 210 determines that a number of variations 218 are to be generated for the XR object 214. In some implementations, the number of variations 218 is a function of a virtual dimension of the XR object 214 and an amount of space that is to be populated with the variations of the XR object 214 in an XR environment. The request interpreter 210 indicates the XR object 214, the visual property 216 and the number of variations 218 to the variation generator 220.

In various implementations, the variation generator 220 generates the number of variations 218 of the XR object 214 by determining respective values 222 for the visual property 216 of the XR object 214. In some implementations, the variation generator 220 determines the values 222 in accordance with a distribution criterion. In some implementations, the distribution criterion indicates a distribution range for the values of the visual property. In some implementations, the values 222 are bounded by the distribution range (e.g., the thickness distribution range 64 shown in FIG. 1G, the height distribution range 68 shown in FIG. 1H, the orientation distribution range 74 shown in FIG. 1I, the color distribution range 78 shown in FIG. 1J, and/or the gap distribution range 82 shown in FIG. 1K).

In some implementations, the variation generator 220 includes a machine-learned model 230 that generates the values 222, and a trainer 240 that trains the machine-learned model 230 to generate the values 222. In some implementations, the machine-learned model 230 includes a neural network system (e.g., a recurrent neural network (RNN), convolutional neural network (CNN) or the like). In some implementations, the trainer 240 provides neural network weights to the neural network system during a training phase. In some implementations, the trainer 240 obtains training data 242 in the form of images 244. In such implementations, the trainer 240 extracts features from the images 244 and utilizes the features to train the machine-learned model 230. In some implementations, the training data 242 (e.g., the images 244) correspond to a particular time period 246 (e.g., images of bookshelves in a library from the 1930s). In such implementations, the trainer 240 trains the machine-learned model 230 to generate values 222 that correspond to variations that are similar to corresponding physical articles from that particular time period 246. For example, if the images 244 are of bookshelves from the 1930s, then the trainer 240 trains the machine-learned model 230 to generate values 222 that correspond to variations that are similar to variations between physical books from the 1930s.

In some implementations, the XR object renderer 250 generates the variations 252 for the XR object 214 based on the values 222. The XR object renderer 250 displays (e.g., renders) the variations 252 in an XR environment (e.g., the XR environment 20 shown in FIGS. 1A-1K).

Figure 3A:
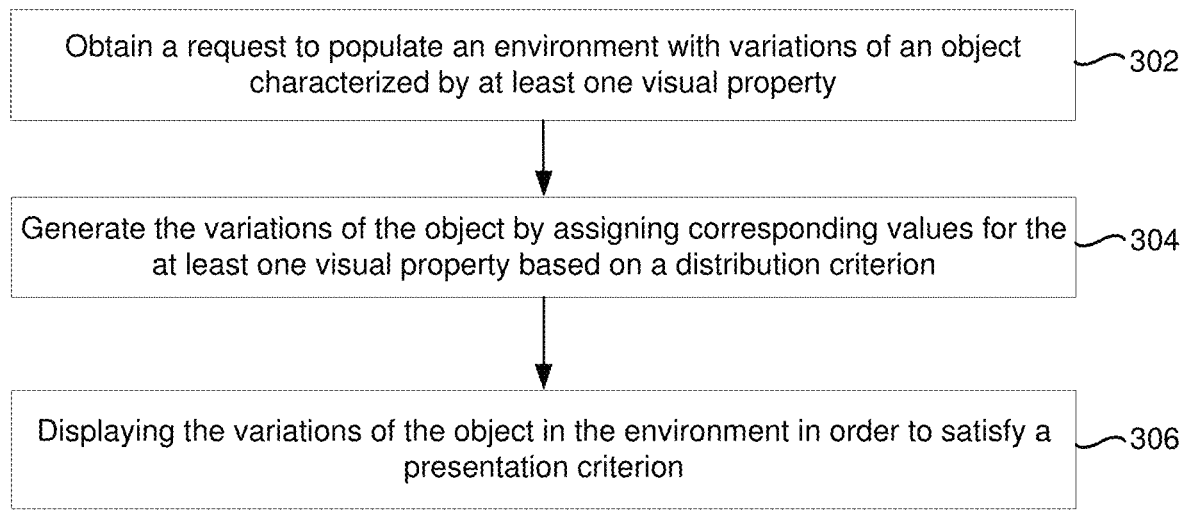
FIGS. 3A-3C are flowchart representations of a method of generating variations of an object in accordance with some implementations.

FIG. 3A is a flowchart representation of a method 300 of generating variations of an XR object. In various implementations, the method 300 is performed by a device with a display, a non-transitory memory and one or more processors coupled with the display and the non-transitory memory (e.g., the electronic device 12 shown in FIG. 1A). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 302, in some implementations, the method 300 includes obtaining a request to populate an XR environment with variations of an XR object characterized by at least one visual property. In some implementations, the method 300 includes detecting a user input that corresponds to the request to populate the XR environment with variations of the XR object. For example, as shown in FIG. 1F, the user input 122 corresponds to a request to populate the XR bookshelf 30 with variations of the XR book 60.

As represented by block 304, in some implementations, the method 300 includes generating the variations of the XR object by assigning corresponding values for the at least one visual property based on one or more distribution criterion. For example, as shown in FIG. 2, the variation generator 220 assigns the values 222 for the visual property 216 of the XR object 214. In some implementations, the method 300 includes assigning values that are within a distribution range. For example, as shown in FIG. 1G, the first thickness value 62 for the first variation 60-1, the second thickness value 62' for the second variation 60-2 and the third thickness value 62" for the third variation 60-3 are within the thickness distribution range 64.

As represented by block 306, in some implementations, the method 300 includes displaying the variations of the XR object in the XR environment in order to satisfy a presentation criterion. In some implementations, the presentation criterion specifies that a distribution range of the values for the visual property match a distribution of a corresponding visual characteristic of a physical article that corresponds to the XR object. For example, if most physical cars in a physical parking lot are silver, gray or blue then most variations of an XR car in an XR parking lot are assigned color values that correspond to silver, gray or blue. In various implementations, satisfying the presentation criterion allows the XR environment to appear more realistic thereby enhancing a user experience of the device.

In some implementations, the presentation criterion specifies that a distribution range of the values for the visual property match a distribution of a corresponding visual characteristic from a particular time period. As an example, if variations of an XR airplane are to resemble variations in physical planes from the 1950s, then the color of most variations is set to stainless steel as stainless steel was popular. As another example, if variations of an XR book are to resemble variations in physical books from the early 19th century, then the texture of most variations of an XR book is set to correspond to leather because many books in the early 19th century were leather-bound books.

In various implementations, assigning values for the visual property based on a distribution criterion reduces a need for user inputs that correspond to changing values for the visual property after instantiating numerous replicas of the same XR object in an XR environment. In some implementations, reducing the need for user inputs that correspond to manually changing the values for the visual property tends to enhance a user experience of the device. In some implementations, reducing the need for user inputs that correspond to manually changing the values for the visual property tends to improve an operability of the device, for example, by reducing an amount of time that a display of the device is kept on thereby increasing a battery life of the device.

Figure 3B:
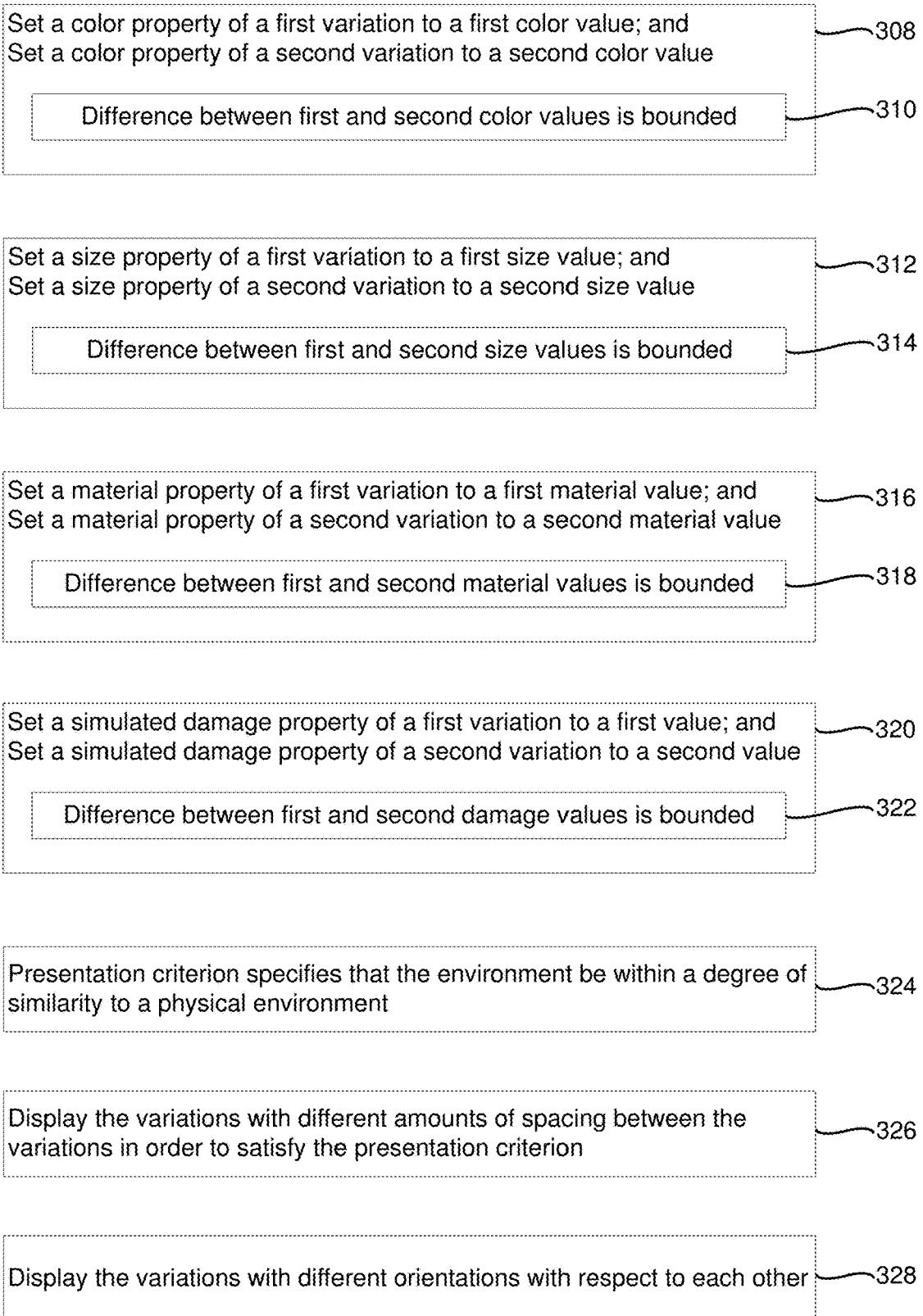

Referring to FIG. 3B, as represented by block 308, in some implementations, the method 300 includes setting a color property of a first one of the variations to a first color value, and setting a color property of a second one of the variations to a second color value that is different from the first color value. For example, as shown in FIG. 1J, the first variation 60-1 has a first color value 76, the seventh variation 60-7 has a second color value 76' (e.g., as indicated by the cross-hatching) and the eighth variation 60-8 has a third color value 76" (e.g., as indicated by the solid black).

As represented by block 310, in some implementations, a difference between the first color value and the second color value is bounded by a color value range. For example, as shown in FIG. 1J, the first color value 76, the second color value 76' and the third color value 76" are within the color distribution range 78. In some implementations, the color value range encompasses color values of variations of a physical article that matches the XR object.

As represented by block 312, in some implementations, the method 300 includes setting a size property of a first one of the variations to a first size value, and setting a size property of a second one of the variations to a second size value that is different from the first size value. For example, as shown in FIG. 1G, the first variation 60-1 has a thickness that corresponds to a first thickness value 62, the second variation 60-2 has a thickness that corresponds to a second thickness value 62', and the third variation 60-3 has a thickness that corresponds to a third thickness value 62".

As represented by block 314, in some implementations, a difference between the first size value and the second size value is bounded by a size value range. For example, as shown in FIG. 1G, the first thickness value 62, the second thickness value 62' and the third thickness value 62" are within the thickness distribution range 64. In some implementations, the thickness distribution range encompasses thickness values of variations of a physical article that matches the XR object. For example, in some implementations, the thickness distribution range 64 shown in FIG. 1G encompasses thickness values of various physical books.

As represented by block 316, in some implementations, the method 300 includes setting a material property of a first one of the variations to a first material value, and setting a material property of a second one of the variations to a second material value that is different from the first material value. For example, in some implementations, the method 300 includes setting a texture property of a first one of the variations to a first texture value (e.g., a value that corresponds to a smooth texture such as a glossy finish), and setting a texture property of a second one of the variations to a second texture value that is different from the first texture value (e.g., a value that corresponds to a rough texture such as a coarse finish).

As represented by block 318, in some implementations, a difference between the first material value and the second material value is bounded by a material value range. In some implementations, the material value range encompasses material values of variations of a physical article that matches the XR object. For example, in some implementations, the material value range encompasses material values of various physical books.

As represented by block 320, in some implementations, the method 300 includes setting a simulated damage property of a first one of the variations to a first simulated damage value, and setting a simulated damage property of a second one of the variations to a second simulated damage value that is different from the first simulated damage value. For example, in some implementations, the method 300 includes displaying the first one of the variations with a first amount of wear-and-tear, and displaying the second one of the variations with a second amount of wear-and-tear. As an example, in some implementations, the first variation 60-1 of the XR book 60 is displayed with a bent cover, and the second variation 60-2 of the XR book 60 is displayed with a faded cover and some torn pages.

As represented by block 322, in some implementations, a difference between the first simulated damage value and the second simulated damage value is bounded by a simulated damage value range. In some implementations, the simulated damage value range encompasses degrees of physical damage of variations of a physical article that matches the XR object. For example, in some implementations, the simulated damage value range encompasses various degrees of physical damage of a set of physical books.

As represented by block 324, in some implementations, the presentation criterion specifies that the XR environment be within a degree of similarity to a physical environment. For example, the presentation criterion specifies that the XR environment match the physical environment. As an example, in some implementations, the presentation criterion specifies that an XR parking lot match a physical parking lot from the 1950s. In this example, variations of an XR car are generated by assigning values for a visual property of the XR car that match visual features of physical cars from the 1950s. As another example, in some implementations, the presentation criterion specifies that an XR bookshelf match a physical bookshelf in a physical library from the 1920s. In this example, variations of an XR book are generated by assigning values for a visual property of the XR book that match visual features of physical books from the 1920s.

As represented by block 326, in some implementations, the method 300 includes displaying the variations with different amounts of spacing between the variations in order to satisfy the presentation criterion. For example, as illustrated in FIG. 1K, there is a first amount of gap 80 between the eleventh variation 60-11 and the twelfth variation 60-12, a second amount of gap 80' between the tenth variation 60-10 and the eleventh variation 60-11, and a third amount of gap 80" between the ninth variation 60-9 and the tenth variation 60-10. In a physical environment, variations of a physical article are often arranged with different amounts of spacing therebetween. For example, in a physical parking lot some cars are closer to each other while others are farther away from each other. Hence, displaying the variations with different amounts of spacing between the variations tends to make the XR environment appear more realistic. As an example, an amount of spacing between a first set of two XR cars is different from an amount of spacing between a second set of two XR cars in order to display an XR parking lot that appears more realistic.

As represented by block 328, in some implementations, the method 300 includes displaying the variations with different orientations with respect to each other. For example, as illustrated in FIG. 1I, the first variation 60-1 is displayed at an orientation that corresponds to a first orientation value 70, and the sixth variation 60-6 is displayed at an orientation that corresponds to a second orientation value 70' that is different from the first orientation value 70. As another example, in an XR parking lot, some variations of an XR car are placed parallel to parking lot lines while other variations of the XR car are placed at an angle.

Figure 3C:
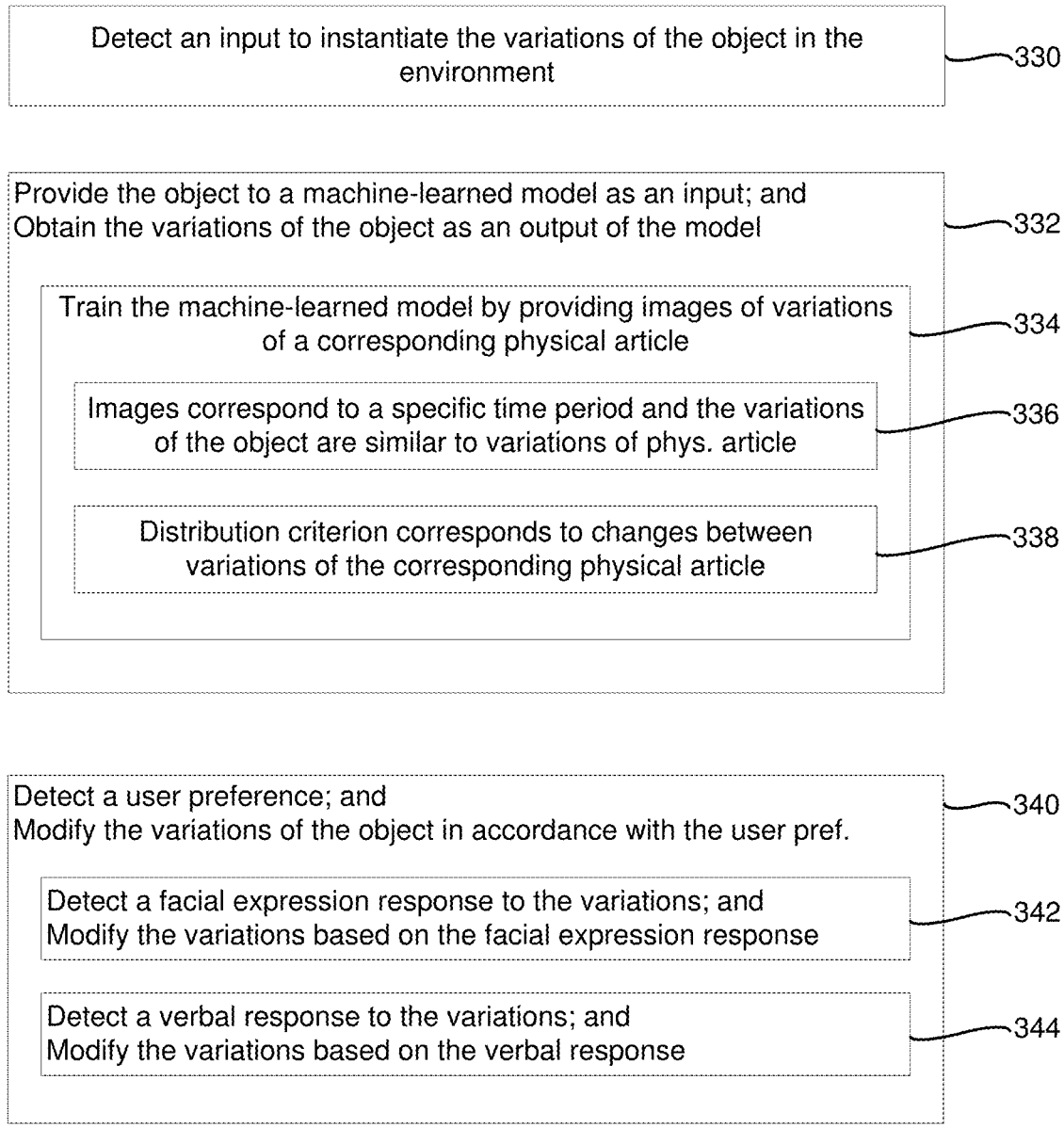

Referring to FIG. 3C, as represented by block 330, in some implementations, the method 300 includes detecting an input to instantiate the variations to the XR object in the XR environment. In some implementations, the method 300 includes detecting a user input. For example, as shown in FIG. 1F, the user input 122 corresponds to a request to generate and display variations of the XR book 60. In some implementations, the method 300 includes detecting a voice command (e.g., "fill the bookshelf with books").

As represented by block 332, in some implementations, the method 300 includes providing the XR object to a machine-learned model as an input, and obtaining the variations of the XR object as an output of the machine-learned model. For example, as shown in FIG. 2, the variation generator 220 includes a machine-learned model 230 that generates the values 222 for the visual property 216 of the XR object 214.

As represented by block 334, in some implementations, the method 300 includes training the machine-learned model to generate the variations by providing the machine-learned model training data that includes one or more images of variations of a corresponding physical article. For example, as shown in FIG. 2, the trainer 240 obtains the training data 242, and utilizes the training data 242 to train the machine-learned model 230. As illustrated in FIG. 2, the training data 242 includes a set of one or more images 244.

As represented by block 336, in some implementations, the one or more images correspond to a specific time period and the variations of the XR object are within a degree of similarity to the variations of the corresponding physical article from that specific time period. For example, if the images are of bookshelves in a library from the 1920s, then the variations of the XR book are similar to the physical books in the 1920s.

As represented by block 338, in some implementations, the one or more distribution criterion corresponds to changes between variations of the corresponding physical article represented in the training data. For example, the thickness distribution range 64 (shown in FIG. 1G) corresponds to differences in thickness of physical books represented in the training data.

As represented by block 340, in some implementations, the method 300 includes detecting a user preference, and modifying the variations of the XR object in accordance with the user preference. In some implementations, the method 300 includes changing a value of a visual property based on the user preference. For example, setting values of a color property of the variations to colors that the user prefers.

As represented by block 342, in some implementations, the method 300 includes detecting, via a camera, a facial expression response to the variations, and modifying the variations based on the facial expression response. For example, in some implementations, the method 300 includes utilizing gaze tracking and facial expression tracking to detect a frown directed at a particular variation, and changing a value of a visual property of that particular variation. In some implementations, the method 300 includes detecting a smile directed to a particular variation, and utilizing a value of a visual property of that particular variation more often.

As represented by block 344, in some implementations, the method 300 includes detecting, via a microphone, a verbal response to the variations, and modifying the variations based on the verbal response. For example, in some implementations, the method 300 includes utilizing gaze tracking and voice tracking to detect a sigh at a particular variation, and changing a value of a visual property of that particular variation. In some implementations, the method 300 includes detecting a cheer directed at a particular variation, and utilizing a value of a visual property of that particular variation more often.

Figure 4:
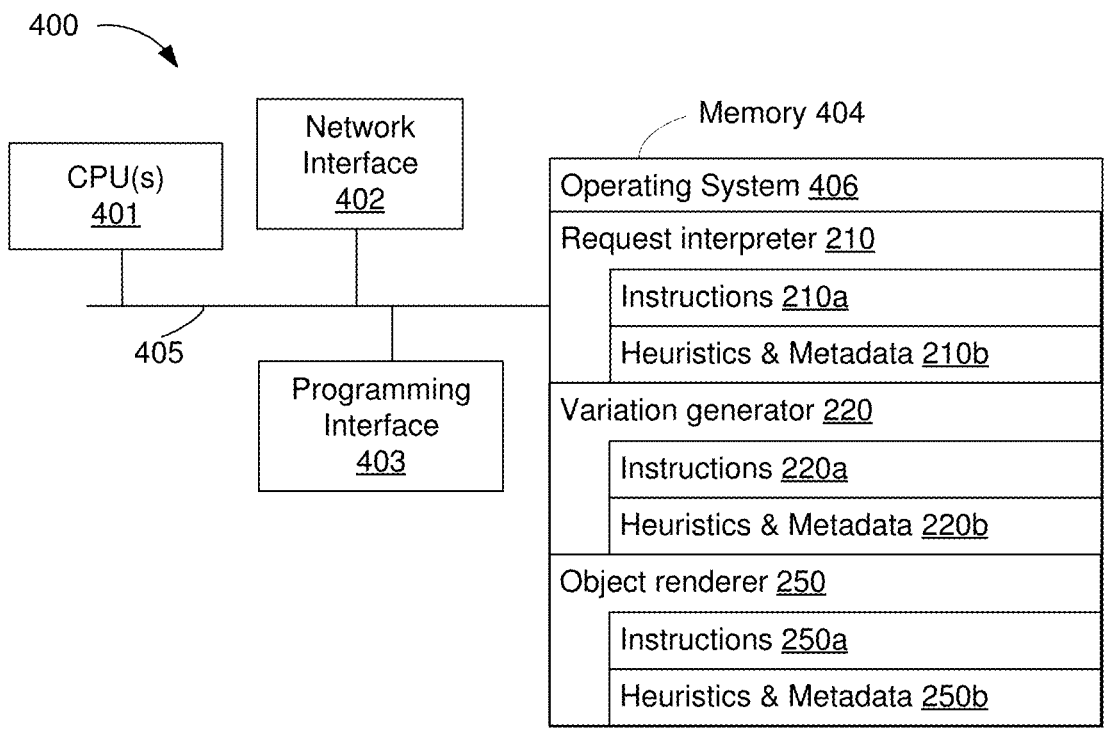
FIG. 4 is a block diagram of a device that generates variations of an object in accordance with some implementations.

FIG. 4 is a block diagram of a device 400 that generates variations of an XR object in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the request interpreter 210, the variation generator 220, and the XR object renderer 250. In various implementations, the device 400 performs the method 300 shown in FIGS. 3A-3C. In various implementations, the device 400 implements the electronic device 12 shown in FIG. 1A.

In some implementations, the request interpreter 210 obtains a request to populate an XR environment with variations of an XR object. In some implementations, the request interpreter 210 performs the operations(s) represented by block 302 in FIG. 3A. To that end, the request interpreter 210 includes instructions 210a, and heuristics and metadata 210b. In some implementations, the variation generator 220 generates the variations of the XR object by assigning corresponding values for a visual property based on a distribution criterion. In some implementations, the variation generator 220 performs the operations(s) represented by block 304 in FIG. 3A. To that end, the variation generator 220 includes instructions 220a, and heuristics and metadata 220b. In some implementations, the XR object renderer 250 displays the variations of the XR object in the XR environment in order to satisfy a presentation criterion. In some implementations, the XR object renderer 250 performs the operation(s) represented by block 306 in FIG. 3A. To that end, the XR object renderer 250 includes instructions 250a, and heuristics and metadata 250b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first object could be termed a second object, and, similarly, a second object could be termed a first object, which changing the meaning of the description, so long as all occurrences of the "first object" are renamed consistently and all occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, an input device, a non-transitory memory and one or more processors coupled with the display, the input device and the non-transitory memory:
        displaying, on the display, a graphical environment that includes a first variation of a graphical object characterized by at least one visual property;
        detecting, via the input device, a first user input that is directed to the first variation of the graphical object;
        in response to detecting the first user input, displaying, on the display, a menu that includes a delete affordance for deleting the first variation of the graphical object and a fill affordance for populating the graphical environment with additional variations of the graphical object;
        after displaying the menu, detecting, via the input device, a second user input directed to the fill affordance;
        generating the additional variations of the graphical object by assigning corresponding values for the at least one visual property, wherein a presentation criterion specifies that a distribution range of the corresponding values match a distribution of a corresponding visual characteristic of a physical article that the graphical object represents; and
        displaying, on the display, the additional variations of the graphical object in the graphical environment in satisfaction of the presentation criterion.

2. The method of claim 1, wherein generating the additional variations of the graphical object comprises:
    setting a color property of a first one of the additional variations of the graphical object to a first color value that is within the distribution range; and
    setting a color property of a second one of the additional variations of the graphical object to a second color value that is different from the first color value and within the distribution range.

3. The method of claim 1, wherein generating the additional variations comprises:
    setting a size property of a first one of the additional variations to a first size value that is within the distribution range; and setting a size property of a second one of the additional variations to a second size value that is different from the first size value and within the distribution range.

4. The method of claim 1, wherein generating the additional variations comprises:
   setting a material property of a first one of the additional variations to a first material value; and
   setting a material property of a second one of the additional variations to a second material value that is different from the first material value and within the distribution range.

5. The method of claim 1, wherein generating the additional variations comprises:
   setting a simulated damage property of a first one of the additional variations to a first simulated damage value that is within the distribution range; and
   setting a simulated damage property of a second one of the additional variations to a second simulated damage value that is different from the first simulated damage value and within the distribution range.

6. The method of claim 1, wherein displaying the additional variations comprises:
   displaying the additional variations with different amounts of spacing between the additional variations.

7. The method of claim 1, wherein displaying the additional variations comprises:
   displaying the additional variations with different orientations.

8. The method of claim 1, wherein generating the additional variations comprises:
   providing the graphical object to a machine-learned model as an input; and
   obtaining the additional variations of the graphical object from the machine-learned model as an output of the machine-learned model.

9. The method of claim 8, further comprising:
   training the machine-learned model to generate the additional variations by providing the machine-learned model training data that includes one or more images of variations of a corresponding physical article.

10. The method of claim 1, wherein generating the additional variations comprises:
    detecting a user preference; and
    assigning the corresponding values for the at least one visual property in accordance with the user preference.

11. A device comprising:
    one or more processors;
    a display;
    an input device;
    a non-transitory memory; and
    one or more programs stored in the non-transitory memory, which, when executed by the one or more processors, cause the device to:
      display, on the display, a graphical environment that includes a first variation of a graphical object characterized by at least one visual property;
      detect, via the input device, a first user input that is directed to the first variation of the graphical object;
      in response to detecting the first user input, display, on the display, a menu that includes a delete affordance for deleting the first variation of the graphical object and a fill affordance for populating the graphical environment with additional variations of the graphical object;
      after displaying the menu, detect, via the input device, a second user input directed to the fill affordance;
      generate the additional variations of the graphical object by assigning corresponding values for the at least one visual property, wherein a presentation criterion specifies that a distribution range of the corresponding values match a distribution of a corresponding visual characteristic of a physical article from a particular time period; and
      display, on the display, the additional variations of the graphical object in the graphical environment in satisfaction of the presentation criterion.

12. The device of claim 11, wherein generating the additional variations of the graphical object comprises:
    setting a color property of a first one of the additional variations of the graphical object to a first color value that is within the distribution range; and
    setting a color property of a second one of the additional variations of the graphical object to a second color value that is different from the first color value and within the distribution range.

13. The device of claim 11, wherein generating the additional variations comprises:
    setting a size property of a first one of the additional variations to a first size value that is within the distribution range; and
    setting a size property of a second one of the additional variations to a second size value that is different from the first size value and within the distribution range.

14. The device of claim 11, wherein generating the additional variations comprises:
    setting a material property of a first one of the additional variations to a first material value that is within the distribution range; and
    setting a material property of a second one of the additional variations to a second material value that is different from the first material value and within the distribution range.

15. The device of claim 11, wherein displaying the additional variations comprises:
    displaying the additional variations with different amounts of spacing between the additional variations.

16. A non-transitory memory storing one or more programs, which, when executed by one or more processors of a device with a display and an input device, cause the device to:
    display, on the display, a graphical environment that includes a first variation of a graphical object characterized by a color property;
    detect, via the input device, a first user input that is directed to the first variation of the graphical object;
    in response to detecting the first user input, display, on the display, a menu that includes a delete affordance for deleting the first variation of the graphical object and a fill affordance for populating the graphical environment with additional variations of the graphical object;
    after displaying the menu, detect, via the input device, a second user input directed to the fill affordance;
    generate the additional variations of the graphical object by assigning corresponding values for the color property, wherein a color presentation criterion specifies that a distribution range of the corresponding values match a color distribution of a physical article that the graphical object represents; and
    display, on the display, the additional variations of the graphical object in the graphical environment in order to satisfy a presentation criterion.

17. The non-transitory memory of claim 16, wherein generating the additional variations of the graphical object comprises:
- setting a color property of a first one of the additional variations of the graphical object to a first color value that is within the distribution range; and
- setting a color property of a second one of the additional variations of the graphical object to a second color value that is different from the first color value and within the distribution range.

18. The non-transitory memory of claim 16, wherein generating the additional variations comprises:
- setting a size property of a first one of the additional variations to a first size value that is within the distribution range; and
- setting a size property of a second one of the additional variations to a second size value that is different from the first size value and within the distribution range.

19. The non-transitory memory of claim 16, wherein generating the additional variations comprises:
- setting a simulated damage property of a first one of the additional variations to a first simulated damage value that is within the distribution range; and
- setting a simulated damage property of a second one of the additional variations to a second simulated damage value that is different from the first simulated damage value and within the distribution range.

20. The non-transitory memory of claim 16, wherein displaying the additional variations comprises:
- displaying the additional variations with different orientations.

* * * * *